(12) United States Patent  (10) Patent No.: US 8,532,719 B2
Wang et al.  (45) Date of Patent: Sep. 10, 2013

(54) METHODS AND SYSTEMS FOR APPLICATION PROCEDURE MANAGEMENT (75) Inventors: Hui-Wen Wang, Taoyuan County (TW); Yih-Feng Kao, Taoyuan County (TW); Fu-Chiang Chou, Taoyuan County (TW); Hok-sum H Luke, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 945 days.

(21) Appl. No.: 12/633,529

(22) Filed: Dec. 8, 2009

(65) Prior Publication Data

US 2011/0054650 A1 Mar. 3, 2011

(30) Foreign Application Priority Data

Aug. 25, 2009 (TW) .............................. 98128478 A (51) Int. Cl.
H04B 1/38 (2006.01)
(52) U.S. Cl.
USPC ......................................... 455/574; 455/566
(58) Field of Classification Search
USPC ...................... 455/550.1, 574, 566
See application file for complete search history.

(56) References Cited

U.S. PATENT DOCUMENTS

| 4,166,358 | A | * | 9/1979 | Tremblay et al. ............. 368/245 |
| 7,113,811 | B2 | * | 9/2006 | Goris et al. ................... 455/574 |
| 2004/0214594 | A1 | | 10/2004 | Holman, IV |
| 2007/0004470 | A1 | | 1/2007 | Goris et al. |
| 2007/0075965 | A1 | | 4/2007 | Huppi et al. |
| 2009/0195704 | A1 | * | 8/2009 | Bombara ...................... 348/734 |

FOREIGN PATENT DOCUMENTS

| CN | 201213634 Y | 4/2009 |
| EP | 1 213 899 A2 | 6/2002 |
| TW | M292709 | 6/2006 |
| WO | 200832214 A | 8/2008 |
| WO | WO 2009/096643 A1 | 8/2009 |

* cited by examiner

*Primary Examiner* — Creighton Smith
(74) *Attorney, Agent, or Firm* — Birch, Stewart, Kolasch & Birch, LLP (57) ABSTRACT Methods and systems for application procedure management are provided. First, an event is received, wherein the event defines a normal procedure and a specific procedure. In response to the event, a sensor is activated to detect a presence of at least one object. If the presence of the object is not detected, the normal procedure for the event is performed. If the presence of the object is detected, the specific procedure for the event is performed. In some embodiments, the executed specific procedure includes inactivating a display unit.

17 Claims, 6 Drawing Sheets

METHODS AND SYSTEMS FOR APPLICATION PROCEDURE MANAGEMENT

CROSS REFERENCE TO RELATED APPLICATIONS

This Application claims priority of Taiwan Patent Application No. 098128478, filed on Aug. 25, 2009, the entirety of which is incorporated by reference herein.

BACKGROUND OF THE INVENTION

1. Field of the Invention

The disclosure relates generally to power management, and, more particularly to methods and systems for power management via application procedure management.

2. Description of the Related Art

Recently, portable devices, such as handheld devices, have become more and more technically advanced and multifunctional. For example, a handheld device may have telecommunication capabilities, e-mail message capabilities, an advanced address book management system, a media playback system, and various other functions. Due to increased convenience and functions of the devices, these devices have become necessities of life.

Generally, a battery can provide operational power to internal units, such as a processing unit, and a display unit of a portable device. Since the portable device has limited power, and related hardware and power are required when various applications are being executed in the portable device, efficiently managing application procedures may greatly affect power management.

BRIEF SUMMARY OF THE INVENTION

Methods and systems for application procedure management are provided.

In an embodiment of a method for application procedure management, an event is received, wherein the event defines a normal procedure and a specific procedure. In response to the event, a sensor is activated to detect a presence of at least one object. If the presence of the object is not detected by the sensor, the normal procedure for the event is performed. If the presence of the object is detected by the sensor, the specific procedure for the event is performed.

In an embodiment of a method for application procedure management, an event is received, wherein the event defines a normal procedure. In response to the event, a sensor is activated to detect a presence of at least one object. If the presence of the object is detected by the sensor, the execution of at least one operation in the normal procedure for the event is canceled.

In an embodiment of a method for application procedure management, an event is received. In response to the event, a sensor is activated to detect a presence of at least one object. If the presence of the object is detected by the sensor, a display unit of an electronic device is inactivated.

An embodiment of a system for application procedure management includes a sensor, a storage unit, and a processing unit. The storage unit records a normal procedure and a specific procedure for an event. The processing unit receives the event, and in response to the event, activates the sensor to detect a presence of at least one object. If the presence of the object is not detected by the sensor, the processing unit performs the normal procedure for the event. If the presence of the object is detected by the sensor, the processing unit performs the specific procedure for the event.

An embodiment of a system for application procedure management includes a sensor, a storage unit, and a processing unit. The storage unit records a normal procedure for an event. The processing unit receives the event, and in response to the event, activates the sensor to detect a presence of at least one object. If the presence of the object is detected by the sensor, the processing unit cancels the execution of at least one operation in the normal procedure for the event.

An embodiment of a system for application procedure management includes a display unit, a sensor, and a processing unit. The processing unit receives the event, and in response to the event, activates the sensor to detect a presence of at least one object. If the presence of the object is detected by the sensor, the processing unit inactivates the display unit.

In some embodiments, when the event is pressing a physical button of the electronic device, and the presence of the object is detected by the sensor, the performed specific procedure is to ignore the event.

In some embodiments, when the event is reception of an incoming call or a notification requesting to activate a display unit by the electronic device, and the presence of the object is detected by the sensor, the performed specific procedure is generation of a voice via a speaker unit of the electronic device.

In some embodiments, when the event is reception of an incoming call by the electronic device, and the presence of the object is detected by the sensor, the performed specific procedure is generation of a crescendo voice via a speaker unit of the electronic device.

Methods and systems for application procedure management may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Methods and systems for application procedure management are provided.

Figure 1:
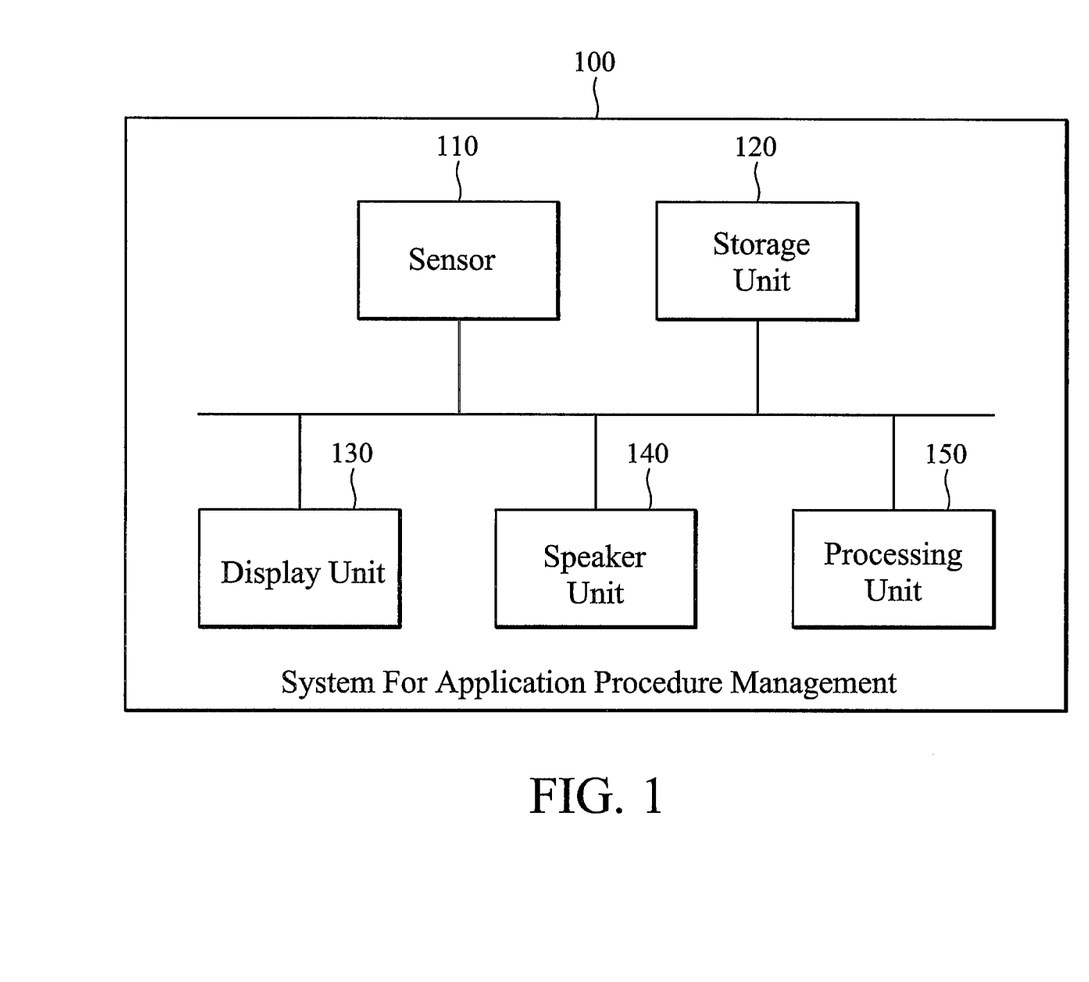
FIG. 1 is a schematic diagram illustrating an embodiment of a system for application procedure management of the invention.

FIG. 1 is a schematic diagram illustrating an embodiment of a system for application procedure management of the invention. The system for application procedure management 100 can be used in an electronic device, such as a portable device comprising handheld devices such as a PDA (Personal Digital Assistant), a smart phone, a mobile phone, a MID (Mobile Internet Device, MID), and a Netbook.

Figure 2:
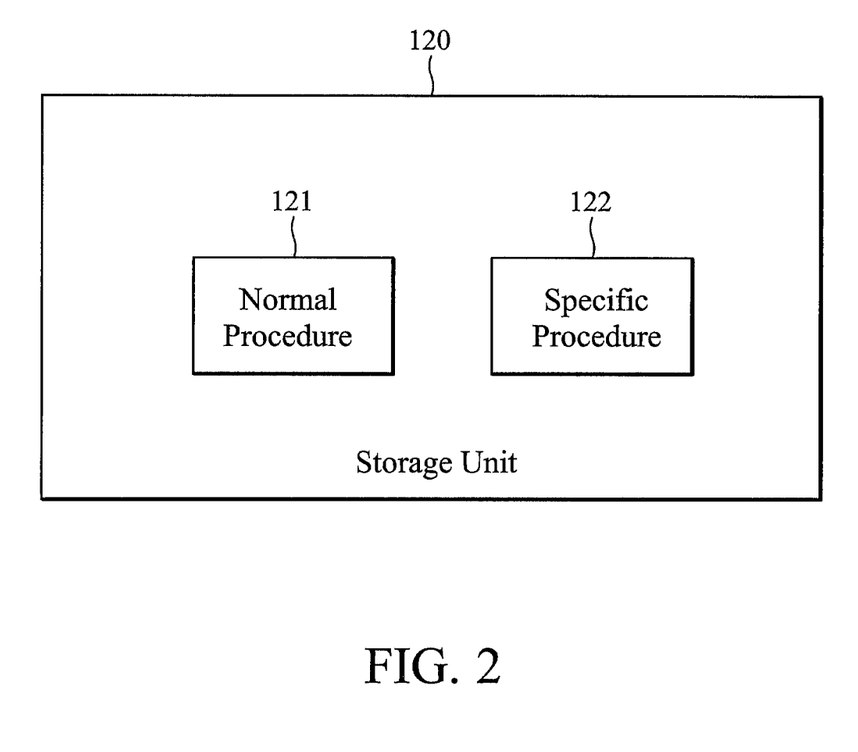
FIG. 2 is a schematic diagram illustrating an embodiment of a storage unit of the invention.

The system for application procedure management 100 comprises a sensor 110, a storage unit 120, a display unit 130, a speaker unit 140, and a processing unit 150. The sensor 110 can detect a presence of at least one object. That is, the sensor 110 can detect whether the object is close to the electronic device. For example, when the electronic device is placed in a pocket or a bag, the sensor 110 can detect the presence of the object. In some embodiments, the sensor 110 may be an infrared proximity sensor set nearby the earphone (not shown) of the electronic device. The storage unit 120 can store a normal procedure 121 and a specific procedure 122 for a respective event, as shown in FIG. 2. In some embodiments, the event may be pressing at least one physical button of the electronic device, and/or a reception of an event, such as an incoming call or a notification requesting to activate the display unit 130 of the electronic device. In some embodiments, the normal procedure 121 can define execution steps needed to be performed when the corresponding event is received. Each step can comprise at least one operation, the hardware required for the operation, and others. In some embodiments, the specific procedure 122 may be a subset of the normal procedure 121. That is, the specific procedure 122 may comprises a part of the execution steps defined in the normal procedure 121. It is understood that, in some embodiments, the storage unit 120 can only store the normal procedure 121 for the event. The use of the normal event 121 and the specific procedure 122 is discussed later. The display unit 130 can display related data, and/or related figures and interfaces. The speaker unit 140 can generate voices. The processing unit 150 performs the method for application procedure management of the invention, which will be discussed further in the following paragraphs.

Figure 3:
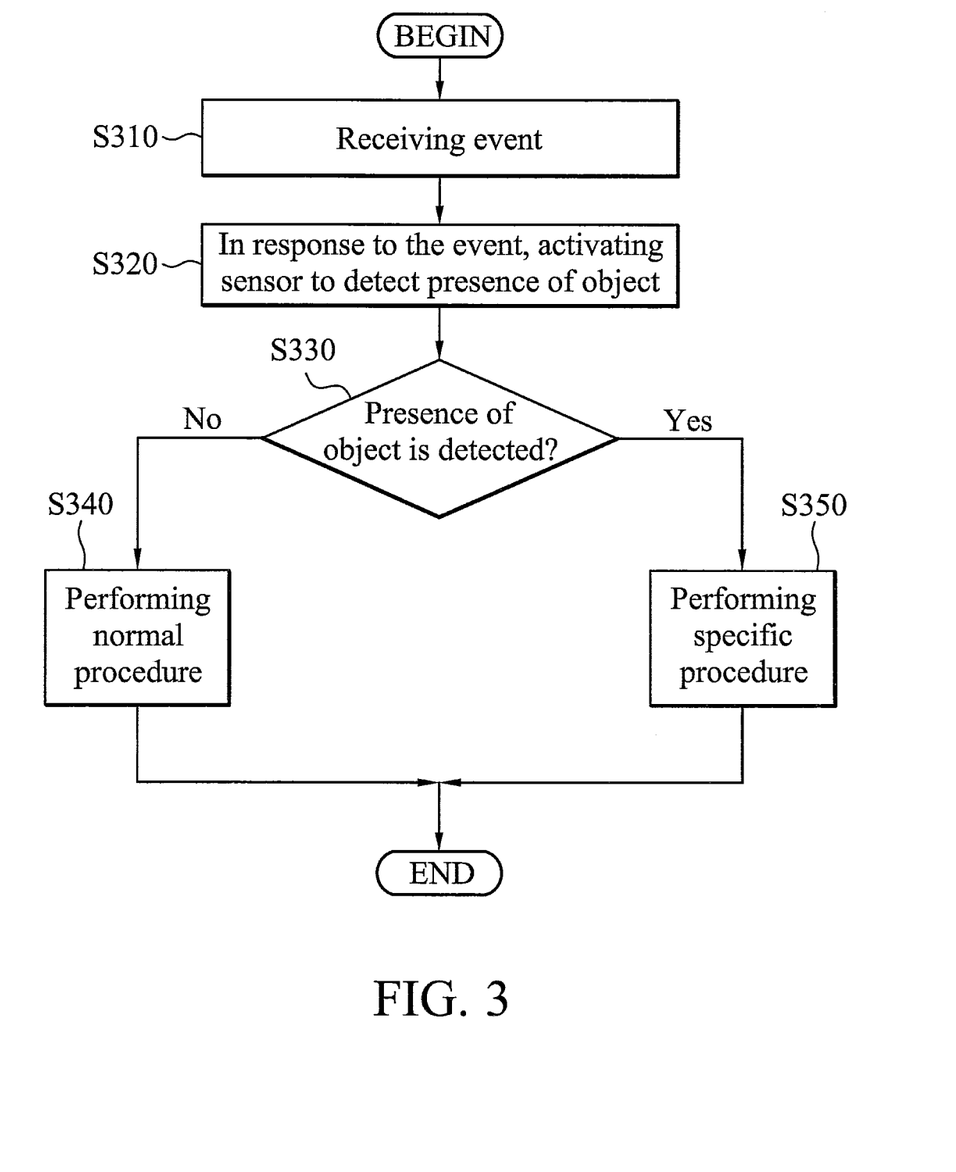
FIG. 3 is a flowchart of an embodiment of a method for application procedure management of the invention.

FIG. 3 is a flowchart of an embodiment of a method for application procedure management of the invention. The method for application procedure management can be used for an electronic device, such as a portable device comprising handheld devices such as a PDA, a smart phone, a mobile phone, an MID, and a Netbook.

In step S310, an event is received. As described, the event may be pressing at least one physical button of the electronic device, and/or a reception of an event, such as an incoming call or a notification requesting to activate the display unit 130. In step S320, in response to the event, the sensor 110 is activated (turned on) to detect a presence of at least one object. If the presence of the object is not detected by the sensor 110 (No in step S330), in step S340, the normal procedure for the event is performed. If the presence of the object is detected by the sensor 110 (Yes in step S330), in step S350, the specific procedure for the event is performed. As described, the normal procedure can define execution steps needed to be performed when the corresponding event is received, wherein each step can comprise at least one operation, the hardware required for the operation, and others. The specific procedure may be a subset of the normal procedure. In some embodiments, the performed specific procedure is inactivating the display unit 130, and/or ignoring of the event. Note that, in some embodiments, after the specific procedure is performed, the sensor 110 can be turned off.

Figure 4:
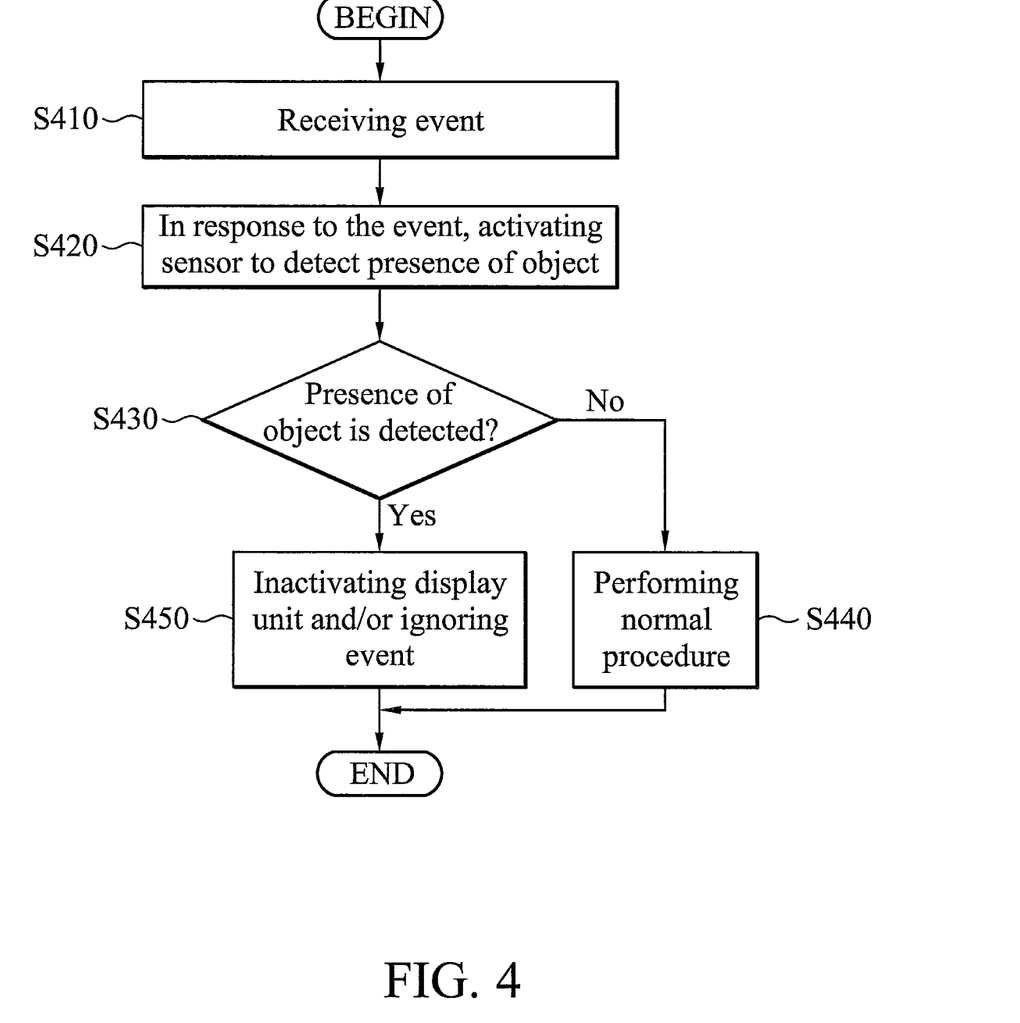
FIG. 4 is a flowchart of another embodiment of a method for application procedure management of the invention.

FIG. 4 is a flowchart of another embodiment of a method for application procedure management of the invention. The method for application procedure management can be used for an electronic device, such as a portable device comprising handheld devices such as a PDA, a smart phone, a mobile phone, an MID, and a Netbook.

In step S410, an event is received. Similarly, the event may be pressing at least one physical button of the electronic device, and/or a reception of an event, such as an incoming call or a notification requesting to activate the display unit 130. In step S420, in response to the event, the sensor 110 is activated to detect a presence of at least one object. If the presence of the object is not detected by the sensor 110 (No in step S430), in step S440, the normal procedure for the event is performed. If the presence of the object is detected by the sensor 110 (Yes in step S430), in step S450, the display unit 130 is inactivated, and/or the event is ignored. Note that, in some embodiments, inactivating the display unit 130 means inactivating a backlight of the display unit 130. It is understood that, in some embodiments, the normal procedure for the event may comprise a step of activation of the display unit 130. When the sensor detects the presence of the object, the execution of at least one operation defined in the normal procedure can be canceled. In other words, the step of activation of the display unit 130 in the normal procedure can be canceled. Note that, in some embodiments, when the sensor detects the presence of the object, in addition to inactivating the display unit 130, and/or ignoring of the event, other steps, such as generation of voices via the speaker unit 140 for the event can be also performed.

Figure 5:
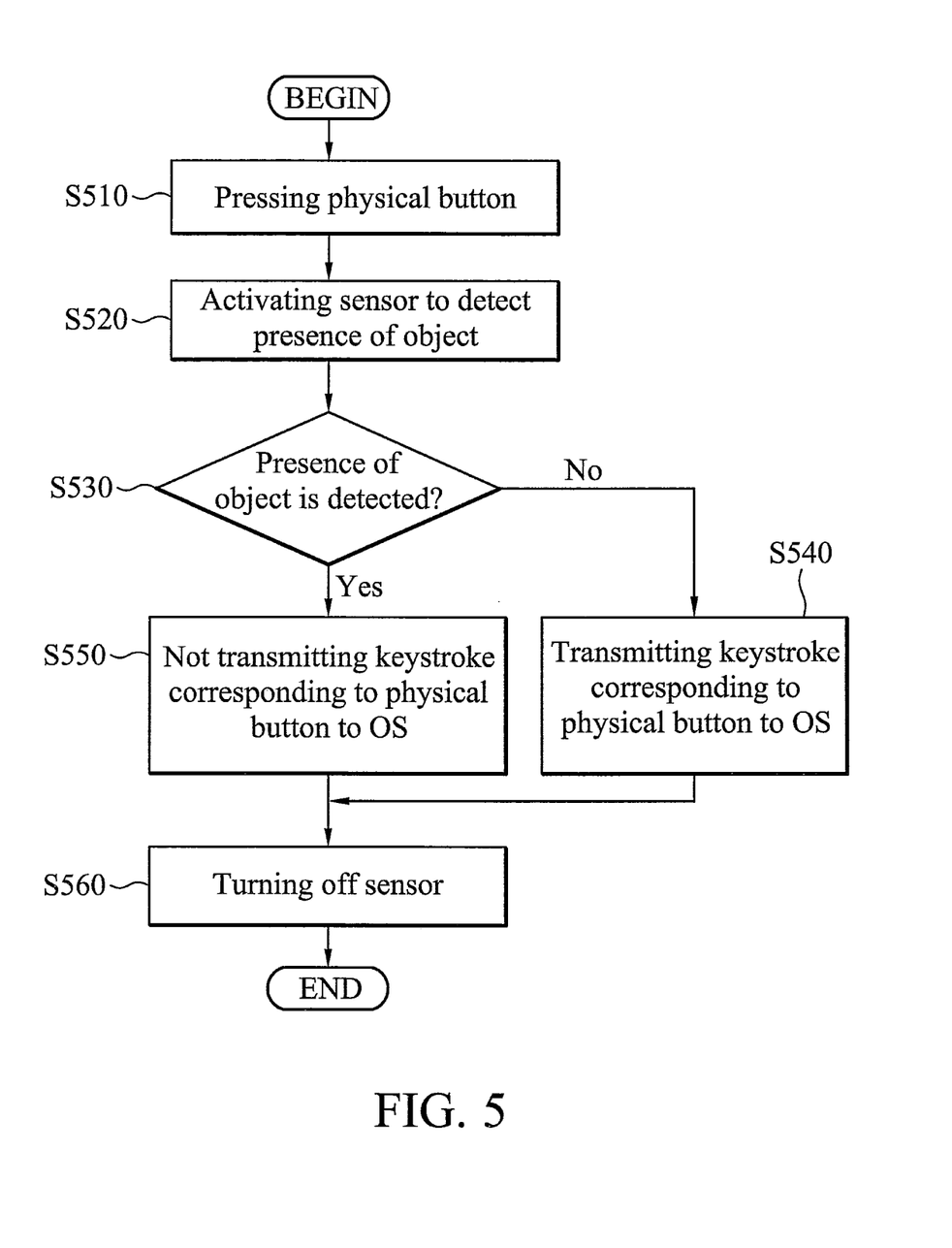
FIG. 5 is a flowchart of an embodiment of a method for application procedure management of the invention when a physical button is pressed.

FIG. 5 is a flowchart of an embodiment of a method for application procedure management of the invention when a physical button is pressed.

In step S510, a physical button of the electronic device is pressed, and in step S520, in response to the press of the physical button, the sensor 110 is activated to detect a presence of at least one object. If the presence of the object is not detected by the sensor 110 (No in step S530), in step S540, a keystroke corresponding to the physical button is transmitted to an OS (Operating System) of the electronic device. Then, in step S560, the sensor 110 is turned off. If the presence of the object is detected by the sensor 110 (Yes in step S530), in step S550, the keystroke corresponding to the physical button is not transmitted to the OS of the electronic device. Then, in step S560, the sensor 110 is turned off. Note that, since the OS does not receive the keystroke corresponding to the physical button, the display unit 130 is not activated.

Figure 6:
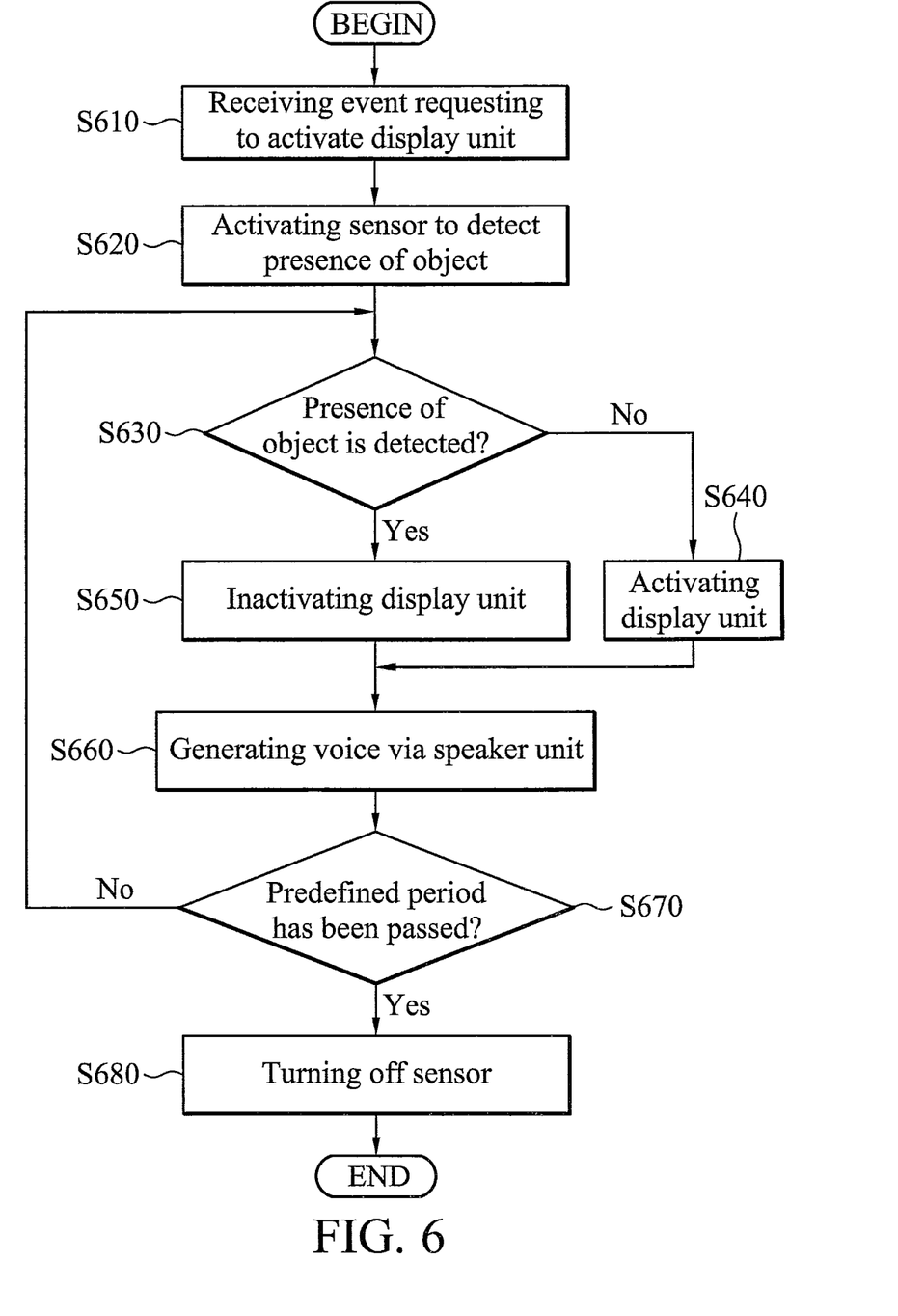
FIG. 6 is a flowchart of an embodiment of a method for application procedure management of the invention when an event requesting to activate a display unit is received.

FIG. 6 is a flowchart of an embodiment of a method for application procedure management of the invention when an event requesting to activate a display unit is received.

In step S610, an event, such as an incoming call or a notification requesting to activate the display unit 130 of the electronic device is received. In step S620, in response to the reception of the event, the sensor 110 is activated to detect a presence of at least one object. If the presence of the object is not detected by the sensor 110 (No in step S630), in step S640, the display unit 130 is activated, and in step S660, a voice is generated via the speaker unit 140. If the presence of the object is detected by the sensor 110 (Yes in step S630), in step S650, the display unit 130 is inactivated, and in step S660, a voice is generated via the speaker unit 140. In some embodiments, a crescendo voice can be generated via the speaker unit 140. Note that, in some embodiments, although the display unit is not activated, the speaker unit 140 can be activated according to the operation defined in the normal procedure. In step S670, it is determined whether a predefined period has been passed. It is understood that, in some embodiments, the predefined period may be a display time of the backlight defined by the display unit. If the predefined period has not been passed (No in step S670), the procedure returns to step S630. It is understood that, once the presence of the object is not detected by the sensor 110, the display unit 130 can be activated. If the predefined period has been passed (Yes in step S670), in step S680, the sensor 110 is turned off. It is understood that, in some embodiments, when the event, such as an incoming call or a notification requesting to activate the display unit 130 of the electronic device is terminated, the sensor 110 can be directly turned off.

Note that, in some embodiments, the electronic device may be set into a silent mode and/or a vibrate mode. When the sensor 110 detects the presence of the object, and the electronic device is not in the silent mode, the electronic device will vibrate to notify users of the reception of the event. Additionally, in some embodiments, when the sensor 110 detects the presence of the object, and the electronic device is not in the silent mode and is not placed at a stable horizontal surface, the electronic device will vibrate to notify users of the reception of the event. Note that, in some embodiments, even if the electronic device is set to not vibrate, the electronic device can still vibrate to notify users the reception of the event. Further, when the sensor 110 detects the presence of the object, and the electronic device is not in the silent mode or the vibrate mode and is not placed at a stable horizontal surface, a crescendo voice can be generated via the speaker unit 140 to notify users the reception of the event. Note that, in some embodiments, when the sensor 110 does not detect the presence of the object or when the event, such as an incoming call or a notification requesting to activate the display unit 130 of the electronic device is terminated, the electronic device will stop the generation of the crescendo voice.

Therefore, the methods and systems can perform power management by managing application procedures. When the sensor of the electronic device detects a presence of an object, the display unit can be inactivated, thus saving power consumption for the electronic device.

Methods and systems for application procedure management, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for application procedure management for use in an electronic device, comprising:
receiving an event, wherein the event defines a normal procedure and a specific procedure;
in response to the event, activating a sensor;
detecting a presence of at least one object by the sensor;
if the presence of the object is not detected by the sensor, performing the normal procedure for the event; and
if the presence of the object is detected by the sensor, performing the specific procedure for the event,
wherein when the event is pressing a physical button of the electronic device, and the presence of the object is detected by the sensor, the performed specific procedure comprises ignoring of the event.

2. The method of claim 1, wherein when the event is pressing the physical button of the electronic device, and the presence of the object is detected by the sensor, the performed specific procedure comprises inactivating a display unit of the electronic device.

3. The method of claim 1, wherein when the event is reception of an incoming call or a notification requesting to activate a display unit of the electronic device by the electronic device, and the presence of the object is detected by the sensor, the performed specific procedure comprises inactivating a display unit.

4. The method of claim 3, wherein when the event is the reception of the incoming call or the notification requesting to activate the display unit of the electronic device by the electronic device, and the presence of the object is detected by the sensor, the performed specific procedure further comprises generation of a voice via a speaker unit of the electronic device.

5. The method of claim 3, further comprising:
continuously determining whether the presence of the object is detected by the sensor during a predefined period; and
when the presence of the object is not detected by the sensor, activating the display unit.

6. The method of claim 5, further comprising turning off the sensor when the predefined period has been passed.

7. The method of claim 1, wherein when the event is reception of an incoming call by the electronic device, and the presence of the object is detected by the sensor, the performed specific procedure comprises generation of a crescendo voice via a speaker unit of the electronic device.

8. The method of claim 1, wherein when the presence of the object is detected by the sensor, the performed specific procedure comprises inactivating a display unit of the electronic device.

9. The method of claim 1, further comprising turning off the sensor after the specific procedure is performed.

10. A system for application procedure management for use in an electronic device, comprising:
a sensor;
a storage unit recording a normal procedure and a specific procedure for an event; and
a processing unit receiving the event, and in response to the event, activating the sensor to detect a presence of at least one object, performing the normal procedure for the event if the presence of the object is not detected by the sensor, and performing the specific procedure for the event if the presence of the object is detected by the sensor,
wherein when the event is pressing a physical button of the electronic device, and the presence of the object is detected by the sensor, the performed specific procedure comprises ignoring of the event.

11. The system of claim 10, further comprising a display unit, wherein when the event is pressing the physical button, and the presence of the object is detected by the sensor, the performed specific procedure comprises inactivating a display unit.

12. The system of claim 10, further comprising a display unit, wherein when the event is reception of an incoming call or a notification requesting to activate the display unit, and the presence of the object is detected by the sensor, the performed specific procedure comprises inactivating a display unit.

13. The system of claim 12, further comprising a speaker unit, wherein when the event is the reception of the incoming call or the notification requesting to activate the display unit, and the presence of the object is detected by the sensor, the performed specific procedure further comprises generation of a voice via a speaker unit.

14. The system of claim 12, wherein the processing unit further continuously determines whether the presence of the object is detected by the sensor during a predefined period, and activates the display unit when the presence of the object is not detected by the sensor.

15. The system of claim 14, wherein the processing unit further turns off the sensor when the predefined period has been passed.

16. The system of claim 10, further comprising a speaker unit, wherein when the event is reception of an incoming call, and the presence of the object is detected by the sensor, the performed specific procedure comprises generation of a crescendo voice via a speaker unit.

17. A non-transitory machine-readable storage medium comprising a computer program, which, when executed, causes a device to perform a method for application procedure management, wherein the method comprises:
- receiving an event, wherein the event defines a normal procedure and a specific procedure;
- in response to the event, activating a sensor;
- detecting a presence of at least one object by the sensor;
- if the presence of the object is not detected by the sensor, performing the normal procedure for the event; and
- if the presence of the object is detected by the sensor, performing the specific procedure for the event,
- wherein when the event is pressing a physical button of the electronic device, and the presence of the object is detected by the sensor, the performed specific procedure comprises ignoring of the event.

\* \* \* \* \*